(No Model.)
J. H. HUBBARD.
PHOTOGRAPHIC APPARATUS FOR HOLDING DRY PLATES.
No. 249,181. Patented Nov. 8, 1881.
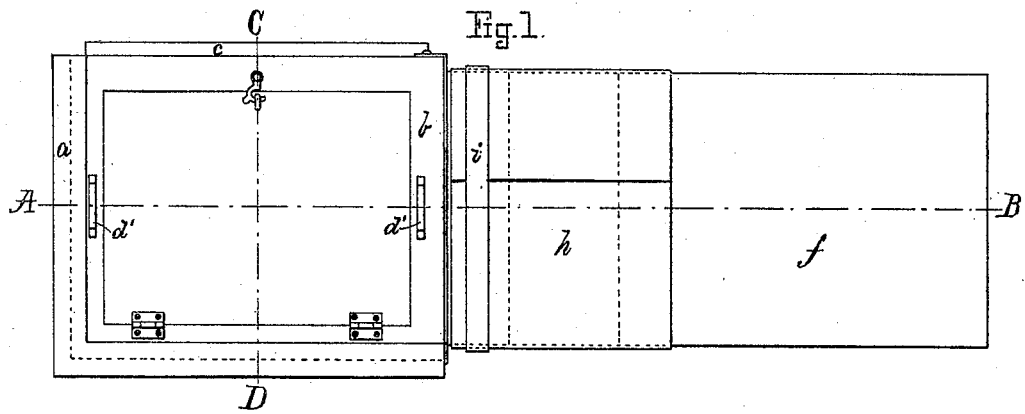
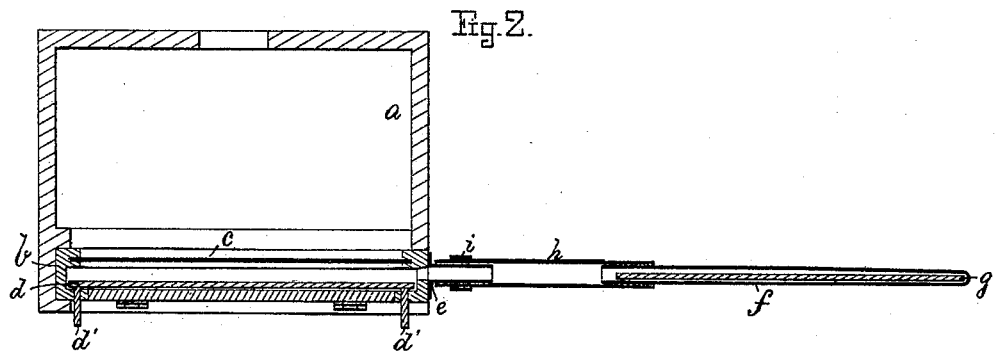
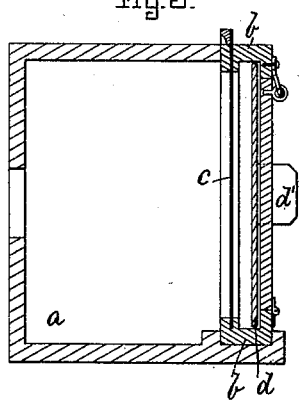 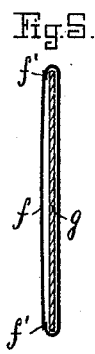 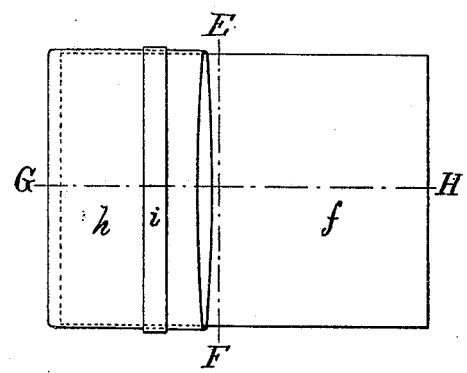
Witnesses:
Henry Chadbourn.
James William Watson.
Inventor:
John H. Hubbard.
by Alban Andrew
his atty.

UNITED STATES PATENT OFFICE.

JOHN H. HUBBARD, OF CAMBRIDGE, MASSACHUSETTS.

PHOTOGRAPHIC APPARATUS FOR HOLDING DRY PLATES.

SPECIFICATION forming part of Letters Patent No. 249,181, dated November 8, 1881.

Application filed August 8, 1881. (No model.)

*To all whom it may concern:*

Be it known that I, JOHN H. HUBBARD, a citizen of the United States, residing at Cambridge, in the county of Middlesex and State of Massachusetts, have invented certain new and useful Improvements in Photographic Apparatus; and I do hereby declare that the same are fully described in the following specification and illustrated in the accompanying drawings.

This invention relates to improvements in photographic apparatus; and it consists of a portable box or case for carrying a photographic dry plate and transferring it to the camera and back again to the said box or case without exposing it to the light, except at the time of taking the picture, when the plate is in position within the camera. Said box or case also serves for the purpose of protecting the prepared photographic plate from light and moisture. The picture taken on the prepared plate may be kept for an indefinite time in the case or box until it is desired to develop it by the usual process.
The portable case or box is made of a size to contain a dry photographic plate; and to prevent the prepared side of the plate from being scratched or defaced when carried in the box or transferred to or from the same.
Said box is provided on two of its inside edges with suitable bearings, as will hereinafter be more fully shown and described. One end of said box or case is closed, its opposite end being open and provided with a flexible tube attached to said open end of the box, which serves two purposes—namely, to be folded on one side of the plate-box, when the prepared plate is contained therein and fastened by means of a rubber band or other suitable fastening, so as to exclude light and moisture from the interior of the said case before or after the plate has been acted upon by the light within the camera; and, secondly, to attach the free end of the said flexible tube to a rigid tube on the plate-holder or on the camera, which rigid tube is of the same size and form as the open end of the plate-box; and when the latter is thus connected to the plate-holder or camera the prepared plate may be transferred from the portable plate-box to the plate-holder or camera for taking a picture and transferred back again to the plate-box after the picture is taken without exposing the prepared plate to the light, except when the picture is being taken in the camera, and by this means I obtain a very small and portable device that can easily be carried on a journey or otherwise for taking outdoor pictures. All that is needed in addition to the camera is one or more of the closed plate boxes, each containing one of the prepared plates. Each plate, after being transferred in the manner described to the camera, and exposed therein as usual for taking the desired picture, may be returned to the plate-box, the flexible tube of which is then detached from the rigid tube on the plate-holder or camera and folded back on the plate-box, and secured by means of a rubber band or other suitable fastener, and in this condition the plate may be kept within the portable box or case without exposure to light or moisture until it is desired to develop the picture at leisure by the usual process.

Within the plate-holder I have a laterally-adjustable focusing semi-transparent glass, which can be pushed forward for focusing the picture to be taken, after which it is moved to the rear to enable the prepared plate to occupy the place at which the focusing-glass was adjusted, and in this manner I dispense with a separate focusing-glass and its frame, by which the size of the camera is much reduced and made more portable.

On the drawings, Figure 1 represents a rear view of the camera and the portable plate-box connected together. Fig. 2 represents a cross-section on the line A B, shown in Fig. 1. Fig. 3 represents a vertical section on the line C D, also shown in Fig. 1. Fig. 4 represents a side view of the portable plate-box as detached from the camera. Fig. 5 represents a vertical section of the plate-box and its prepared glass contained therein, on the line E F, shown in Fig. 4. Fig. 6 represents a horizontal section of said plate-box on the line G H, also shown in Fig. 4.

Similar letters refer to similar parts wherever they occur on the different parts of the drawings.

*a* represents the camera, as usual provided with the detachable plate-holder $b$, in which the usual adjustable dark-slide, $c$, is arranged and operated in the ordinary way.

$d$ is the laterally-adjustable semi-transparent focusing-glass arranged within the plate-holder $b$, and provided with a pair of projections, $d'\ d'$, extending through openings in the rear of the plate-holder $b$, and by means of which projections the said focusing-glass $d$ can be adjusted to and from the position of the prepared plate, as and for the purpose set forth.

$e$ is the rigid tube secured to one side of the plate-holder $b$, over a corresponding perforation, $b'$, therein, as shown in Fig. 2. Said rigid tube $e$ may be located on one of the sides or top of the plate-holder $b$ or camera $a$, as may be desired, without departing from the spirit of my invention.

$f$ represents the portable and detachable plate case or box, in which is contained the prepared dry plate $g$, as shown.

$f'\ f'$ are projecting guides on two opposite insides of the case $f$, as shown in Fig. 5, to prevent the prepared side of the plate $g$ from coming in contact with the inside of the case, as described.

$h$ represents the flexible tube, secured to the open end of the case $f$, the free end of which tube is placed over the rigid tube $e$, as shown in Figs. 1 and 2, when it is desired to transfer the plate $g$ to the camera for taking the picture, and to return it within the case $f$ after the picture is taken, as described, without exposing the said plate to the action of the light, except at the time the picture is taken within the camera.

Figs. 4 and 6 show the flexible tube to be folded over one side of the case $f$, and confined in a closed portion thereon by means of the rubber band $i$, or similar or equivalent fastening device, to exclude the light and moisture from said box or plate-case $f$ and its plate $g$ previous to and after its exposure within the camera and until it is desired to remove the plate in the usual dark-room for the development of the picture. In Figs. 1 and 2 the rubber band $i$ is shown as being used for attaching the open outer end of the flexible tube $h$ to the end of the rigid tube $e$, so as to make a light-tight joint between said rigid and flexible tubes $e\ h$ at the time of transferring the plate $g$ to and from the camera.

Having thus fully described the nature, construction, and operation of my invention, I wish to secure by Letters Patent, and claim—

1. In a photographic apparatus, the herein-described plate box or case $f$, having internal guides, $f'\ f'$, flexible tube $h$, attached to its open end, and provided with a fastener, $i$, as and for the purpose set forth.

2. In combination with the camera $a$, or its plate-holder $b$, the perforation $b'$ and rigidly-secured tube $e$, adapted to fit within the flexible tube $h$ of the plate-case $f$, and to be detached therefrom, as described.

3. In combination, the plate box or case $f$, its flexible tube $h$, the fastener $i$, and the rigid tube $e$ on the camera $a$ or plate-holder $b$, as and for the purpose set forth.

In testimony whereof I have affixed my signature in presence of two witnesses.

JOHN H. HUBBARD.

Witnesses:
ALBAN ANDRÉN,
HENRY CHADBOURN.